United States Patent Office 3,250,738
Patented May 10, 1966

3,250,738
UNSATURATED POLYESTERS AND VINYL CHLO-
RIDE POLYMERS MODIFIED THEREWITH
Philip K. Isaacs, Brookline, and Elizabeth C. Dearborn,
Boston, Mass., assignors to W. R. Grace & Co., Cam-
bridge, Mass., a corporation of Connecticut
No Drawing. Filed Oct. 30, 1961, Ser. No. 148,713
21 Claims. (Cl. 260—40)

This invention relates to unsaturated polyesters and to compositions containing such polyesters in chemical combination with homopolymers and copolymers of vinyl chloride.

Polyvinyl chloride and vinyl chloride copolymerized with another compound of polymerizable olefinic nature, such as vinyl acetate, are in wide commercial use because of their favorable properties and the ease of adapting their inherent properties to meet specific requirements. Polyvinyl chloride, for example, is used extensively because of its tensile properties, electrical properties, colorability, flexibility (when plasticized), and low cost. However, these polymers suffer from several drawbacks which, if overcome, would greatly improve the quality of finished articles made therefrom. For example, finished products cannot be used at temperatures above 60–70° C. due to heat softening, and if processed too long or exposed continuously to temperatures of about 90° C. or higher, discoloration and loss of physical properties result. The products are also subject to severe staining due to absorption of organic colors from accidental stains which cannot be washed away. Floor tiles made from polyvinyl chloride eventually become unsightly due to their inability to resist scratching caused by everyday wear. Another drawback of polyvinyl chloride is lack of dimensional stability in that articles tend to distort if not properly annealed after molding and, even then, slight stresses cause permanent deformation. In plasticized stocks, the products tend to stiffen when exposed to organic solvents and oils due to extraction of plasticizer. Finally, polyvinyl chloride does not adhere to non-porous surfaces nor do many materials adhere to it, such as printing inks.

There are a number of known methods which have been proposed for overcoming one or more of the aforementioned drawbacks. These include crosslinking with amines, crosslinking epoxide plasticizers with anhydrides, etc., crosslinking unsaturated polyester additives, compounding with acrylonitrile rubber, degradation and subsequent sulfur vulcanization, and polymerization of reactive plasticizers, e.g., diallyl phthalate and dimethacrylates. While these methods provide some improvements in polyvinyl chloride, they concomitantly detract from one or more of the inherent advantageous properties that account for its widespread use. Crosslinking, for example, must be effected after processing, i.e., after extrusion, milling, etc., and is an additional time-consuming operation. Also, when crosslinking is carried out at this stage, the processing step becomes very sensitive. The lack of thermoplasticity of the crosslinked polymer precludes reusing scrap material, which often accounts for about 30 percent of the polyvinyl chloride compound. Many of the proposed methods impart undesirable color while others lead to brittleness even in the presence of plasticizers. Many methods are also unsuitable because of short pot life of the compound after addition of catalyst or activator. And, finally most of the additives are quite expensive.

It is, therefore, an object of this invention to improve the properties of polymers and copolymers of vinyl chloride without detracting from their existing desirable properties. This objective is realized by providing a class of unsaturated polyesters and chemically combining such polyesters with homopolymers and copolymers of vinyl chloride in the presence of a peroxide. The result is a graft polymer having thermoplastic characteristics which can be molded by injection, extrusion or compression molding techniques in conventional equipment to give shaped articles, such as floor tiles, coated wire and a variety of industrial and household articles wherein the products possess the improved properties immediately after processing without posttreatment. Specifically, the graft polymers of this invention are moldable and extrudable at 175° C. to give smooth, strong products after prior heating at 175° C. or lower. Improvements in tensile strength at 25° C. and 115° C. of up to 100 percent in value are obtained. There is also a noticeable improvement in heat stability in air-oven aging at 120° C. in terms of discoloration and loss of physical properties.

It is well known that peroxides tend to promote the heat degradation of polyvinyl chloride by initiating dehydrochlorination. It is assumed that thermal degradation commences at the ends of the polyvinyl chloride chain because they bear the active hydrogens. If these hydrogens are removed by peroxide, chain degradation will start. However, if a monomer capable of reacting with the chain end radical formed by peroxide is present, the monomer will graft to the chain and use the radical for its own propagation rather than degradation. The resultant graft polymer will have a higher molecular weight than the original polyvinyl chloride unit, it will be "internally" plasticized if the monomer also functions as a plasticizer, and it may be crosslinked if the monomer is polyfunctional or if it terminates its chain growth by attaching to another polyvinyl chloride molecule. Highly branched polyvinyl chloride would favor the latter because it has more chain ends.

We have found that the compound which is most effective in our system is an unsaturated polyester containing butene dioate groups selected from maleate or fumarate groups or mixtures thereof. This polyester should be compatible with the vinyl chloride polymer or copolymer before reaction so as to allow easy blending and prevent cloudiness and exudation. This means that it should be terminated at both ends by an ester group rather than carboxyl or hydroxyl. The polyester should have at least one and not more than five of the aforesaid butene dioate groups in order to minimize the possibility of crosslinking to infusibility. Finally, its molecular weight should range between about 300 to 4000, preferably between 1000 and 3000. Higher molecular weight leads to problems of gelation and incompatibility, while lower molecular weight products are ineffective in producing the desired combination of properties.

The polyester is conveniently formed by contacting a glycol, a saturated dicarboxylic acid, and a butene dioic compound under esterification conditions and in such proportions as to give a polyester having the requisite molecular weight and the requisite number of butene dioate groups per molecule. The preferred reactants are saturated aliphatic glycols containing 2 to 6 carbon atoms, such as ethylene glycol, diethylene glycol, propylene glycol, triethylene glycol, and neopentyl glycol. The saturated acids include aliphatic dicarboxylic acids having 4 to 10 carbons, such as succinic, glutaric, adipic, pimelic, suberic, azelaic, and sebacic acid, and phthalic acid and its anhydride. While phthalic acid is not, strictly speaking, a saturated acid, its unsaturated sites are incapable of double bond polymerization and, hence, it functions in this reaction as a saturated dicarboxylic acid. The butene dioic compounds are fumaric acid, maleic acid, maleic anhydride, and mixtures thereof.

In order to eliminate terminal carboxyl or hydroxyl groups, a monocarboxylic acid or a monohydroxy alcohol is added. The ratio of these materials to difunctional acids and alcohols also determines the molecular weight of the polyester. Suitable acids are those which contain no reactive groups other than the carboxylic groups and include the saturated aliphatic monocarboxylic acids, such as acetic, propionic, butyric, valeric, caproic, enanthic, caprylic, pelargonic and capric, mono-substituted dicarboxylic acids, such as mono-(di-N-butyl) adipamide, an aromatic monocarboxylic acids such as benzoic and phenyl acetic acid. If more dicarboxylic acid than glycol is used, then an alcohol is needed to terminate growth of the polyester. In such case, carboxyl groups can be eliminated by esterification with an alcohol containing no reactive groups other than the hydroxy group. Suitable alcohols include the saturated aliphatic monohydroxy alcohols containing 2 to 10 carbon atoms, such as ethyl alcohol, propyl alcohol, butyl alcohol, and 2-ethylhexyl alcohol, and aromatic monohydroxy alcohols, such as benzyl alcohol and phenylethanol.

In preparing the polyester, the glycol, dicarboxylic acid, mono-carboxylic acid or monohydroxy alcohol and butene dioic compound are charged to a mixing vessel in such amounts as to produce a polyester having an average molecular weight of between about 300 and 4000 and between about 1 to 5 butene dioate groups per molecule. The term "butene dioate" is defined as that group having the structure

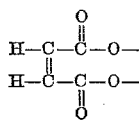

its trans isomer, and mixtures thereof. The reactants are continuously agitated throughout the reaction period. The reaction may be accelerated by the addition of suitable esterification catalysts, such as sulfuric, hydrochloric, and p-toluenesulfonic acids. A small amount of the catalyst, generally between about 0.1 percent of to 0.5 percent based on the weight of the acid reactants has been found sufficient.

To protect this system and the final polyester product against catalytic pro-oxidant metals during synthesis, there is added to the reaction mixture a small amount of a chelating and inactivating agent. These metals, which are introduced as impurities in the glycol and acid reactants, catalyze degradation of the polyester with consequent darkening and viscosity increase of the product. The agent is added in amounts sufficient to react with substantially all of the impurities present in the acids and glycol. The amount of such metal impurities which appears in the commerically-available reactants is of such small order that generally between about 0.1 percent to 0.5 percent by weight based on the total weight of the acids and glycol has been found effective. Suitable agents include the alkali metal polyphosphates, such as sodium and potassium tripolyphosphate.

After all components have been charged to the vessel, the mixture is deaerated in a stream of nitrogen at a pressure of about 20 mm. Hg for about 20 minutes before the reaction mixture is heated. A fractionating column is provided and maintained at about 100° C. so that only the water of condensation is distilled and which is continuously removed as formed. Good agitation is maintained throughout the reaction period.

Esterification is carried out at various pressures and temperatures which are adjusted periodically. Heating commences at about 25° C. and is increased progressively until a temperature of about 215 to 220° C. is reached over a period of about 5 to 8 hours, depending on the reactants. During the heating cycle, the pressure is progressively reduced from about 700 to about 20 mm. Hg. The entire final hour of the reaction is carried out at 215 to 220° C. and 20 to 25 mm. Hg. Upon completion of the reaction period, the product is first cooled under nitrogen to 80° C. and then collected. The resulting polyester is an oily fluid ranging in color from water-white to amber and is not subject to gelation when stored for prolonged periods at room temperature. It has an average molecular weight of between about 300 to 4000, contains about one to five butene dioate groups per molecule, and is substantially devoid of terminal hydroxy and carboxylic groups.

The nature of the vinyl chloride-containing polymer with which the polyesters are chemically combined determines to a large extent the ratios of polyester and peroxide which may be employed to produce the optimum properties. For example, differences in molecular weight, branching, etc., may dictate changes in formulation to prevent gelation during processing. However, in plastisol formulation, these limitations do not apply because the ultimate product is not formed after the initial heating cycle. Representative grades of homopolymers and copolymers of vinyl chloride which have been found effective in this invention include Opalon 630 (suspension grade polyvinyl chloride having a molecular weight of about 40,000), Opalon 660 (suspension grade polyvinyl chloride having a molecular weight of about 60,000), Opalon 440 (emulsion grade polyvinyl chloride having a high molecular weight), Geon 121 (emulsion grade polyvinyl chloride having a very high molecular weight), Pliovic AO (an emulsion grade, low molecular weight copolymer consisting of 95 percent vinyl chloride and 5 percent dibutyl maleate), and Vinylite VYHH (a copolymer having a molecular weight of about 10,000 consisting of 85–88 percent vinyl chloride and 15–12 percent vinyl acetate).

The copolymers useful in this invention contain at least 50 percent and preferably at least 80 percent combined vinyl chloride by weight. Monomers that may be copolymerized with the vinyl chloride include compounds of polymerizable olefinic nature, such as vinyl esters of carboxylic acids, e.g., vinyl acetate, vinyl propionate, vinyl stearate, acrylate and methacrylate esters, and vinylidene chloride.

The peroxide which is used to graft the polyester and the vinyl chloride-containing polymer must have several essential properties. It should have a half-life of about 1 to 20 minutes at the processing temperature of the vinyl chloride, i.e., at temperatures ranging between about 100° C. to 200° C. and should not volatilize appreciably at this temperature range. It must perform the initiation of the grafting reaction without crosslinking the polyester independently, and should not cause polymerization of the polyester on storage at room temperature.

The peroxides which effectively promote the grafting reaction between the polyester and the vinyl chloride-containing polymer are those containing tertiary butyl peroxide groups. Illustrative compounds are ditertiary-butyl peroxide, tertiary-butyl perbenzoate, ditertiary-butyl diperphthalate, 2,5-ditertiary-butyl peroxide-2,5-dimethyl hexane and 2,5 - ditertiary-butyl peroxide - 2,5 - dimethyl hexyne. Interestingly, derivatives of isobutyl peroxide do not effect improvements in the compositions of this invention. Tertiary-butyl hydroperoxide is not effective because it volatilizes at processing temperatures. The amount of peroxide which may be used ranges between about 0.2 to 1 percent based on the weight of the vinyl polymer. Amounts in excess of 1 percent cause bubbles in the finished article.

We have also discovered that the addition of certain finely divided materials which are insoluble but readily dispersible in molten polyvinyl chloride tend to promote the grafting reaction and the improvement of physical properties resulting from such grafting. The mechanism by which these materials act is not understood, but it is believed that they have an affinity for the

groups of the vinyl polymer which are adsorbed on the surface of such materials and localized for intimate reaction with the polyester. Many of the desirable properties can be obtained without their addition, but all properties are enhanced when they are added to the polyester-vinyl chloride-polymer-peroxide system. These materials include certain basic lead salts, such as basic lead phosphite, basic lead silicate sulfate, basic lead phthalate, titanium dioxide, calcium silicate, carbon black, and asbestos. These materials may also act as fillers or stabilizers so that their content may vary considerably. The effective range is about 1 to 50 percent of the total weight of the composition, preferably 3 to 15 percent.

The invention is further illustrated by the following examples and tables:

The ingredients were melted together, deaerated and subjected to a gradually increasing temperature and vacuum, starting from room temperature and 700 mm. Hg and reaching 220° C. and 20 mm. Hg after 4½ hours. The reaction was then continued for another hour at 215 to 220° C. and 20 to 25 mm. Hg. Good agitation and a nitrogen blanket were maintanied throughout the reaction period. The flask was equipped with a reflux condenser to prevent unreacted pelargonic acid from distilling during the reaction. Water of reaction was removed as formed. A total of 238 grams of distillate was collected which corresponded to 229 grams of water theoretically calculated for complete reaction of the ingredients. The product was a water-white oily fluid having an average theoretical molecular weight of 2039 and an average of 2.5 fumarate groups per molecule.

The effectiveness of chemically combining the polyester of Example I with polyvinyl chloride is reflected in Example II and Table I as compared with various modified compositions.

EXAMPLE II

| Component (grams): | 1 | 2 | 3 | 4 | 5 | 6 | 7 | 8 | 9 | 10 | 11 | 12 |
|---|---|---|---|---|---|---|---|---|---|---|---|---|
| Polyester of Example I | | | 7 | 7 | 7 | 26 | 7 | | 7 | 7 | 7 | 7 |
| Opalon 630 (low molecular weight polyvinyl chloride) | 50 | 50 | 50 | 50 | 50 | 50 | 50 | 50 | 50 | 50 | 50 | 50 |
| Diisodecyl phthalate | 26 | 26 | 19 | 19 | 19 | | 19 | 19 | 19 | 19 | 19 | 19 |
| Tribase E (Basic lead silicate sulfate) | 3 | 3 | 3 | | 3 | 3 | 3 | | 3 | 3 | 3 | 3 |
| Varox (2,5-ditertiary-butyl-peroxide-2,5-dimethyl-hexane) | | .1 | | .1 | .1 | .1 | | .1 | | | | |
| 2,5-ditertiary-butyl-peroxide-2,5-dimethyl hexyne | | | | | | | | | .1 | | | |
| Ditertiary-butyl peroxide | | | | | | | | | | .1 | | |
| Ditertiary-butyl diperphthalate | | | | | | | | | | | .1 | |
| Tertiary-butyl perbenzoate | | | | | | | | | | | | .1 |
| Mark KCB (Barium-Cadmium-Zinc-Phosphite stabilizer) | | | | 3 | | | | | | | | |
| Dicumyl peroxide | | | | | | | | .1 | | | | |
| Diethylene glycol dimethacrylate | | | | | | | | 7 | | | | |

EXAMPLE I

A polyester was prepared by charging the following ingredients to a 3-necked flask:

| | Grams | Moles |
|---|---|---|
| Pelargonic acid | 221 | 1.4 |
| Adipic acid | 570 | 3.9 |
| Fumaric acid | 203 | 1.75 |
| Neopentyl glycol | 662 | 6.35 |
| p-Toluenesulfodic acid | 0.99 | |
| Sodium tripolyphosphate | 1.7 | |

All samples were treated in a small Banbury mixer (Brabender plastograph) at 160° C. until no further change in torque was noted. ("Torque" is recorded on the plastograph in units ranging from 0 to 2500 which correspond to very low and very high melt viscosities.) The samples were subsequently pressed into slabs at 175° C. in an electrically-heated press at 30,000 p.s.i. for 5 minutes, and removed from the mold hot. The slabs measured 6″ x 6″ x 50 mils. The physical properties of the slabs are shown in Table I. (The slab numbers correspond to the numbered samples of Example II.)

Table I

| | Slab number | | | | | |
|---|---|---|---|---|---|---|
| | 1 | 2 | 3 | 4 | 5 | 6 |
| Initial plastograph reading | 1,000 | 1,000 | 1,100 | 1,060 | 1,060 | 950 |
| Final plastograph reading | 1,000 | 900 | 950 | 1,000 | 1,600 | 1,400 |
| Moldability | Good | Good | Good | Good | Good | Good |
| Shore D hardness | 38 | 38 | 40 | 44 | 45 | 61 |
| Properties at 25° C.: | | | | | | |
| Tensile modulus, p.s.i. | 2,600 | 2,600 | 2,860 | | 3,250 | 4,000 |
| Elongation, percent | | | 300 | | 300 | 200 |
| Properties at 118° C.: | | | | | | |
| Tensile modulus, p.s.i. | 60 | | 74 | 70 | 120 | 250 |
| Elongation, percent | 200 | | 200 | | 220 | 150 |
| Initial color at 25° C | White | White | White | Clear | White | White |
| Color after 10 days at 121° C | Brown | Dark brown | Light brown | Black | Tan | Off-white |
| Volume resistivity, ohm-cm. at 25° C | $6 \times 10^{12}$ | $6 \times 10^{12}$ | $6 \times 10^{13}$ | $8 \times 10^{12}$ | $8 \times 10^{14}$ | $>10^{15}$ |
| Percent oil extraction, 15 hrs. at 85° C | 5 | 5 | 5 | 3.5 | 2 | 1 |

Table I—Continued

|  | Slab number | | | | | |
| --- | --- | --- | --- | --- | --- | --- |
|  | 7 | 8 | 9 | 10 | 11 | 12 |
| Initial plastograph reading | 1,000 | 1,000 | 1,050 | 1,000 | 650 | 1,100. |
| Final plastograph reading | 1,600 | 1,200 | 900 | 850 | 800 | 1,700. |
| Moldability | Poor | Good | Good | Good | Good | Good. |
| Shore D hardness | 50 | 50 | 50 | 52 | 50 | 52. |
| Properties at 25° C.: |  |  |  |  |  |  |
| Tensile modulus, p.s.i | 3,000 | 2,200 | 3,170 | 2,860 | 3,200 | 3,400. |
| Elongation, percent | 300 | 260 | 275 | 300 | 300 | 250. |
| Properties at 118° C.: |  |  |  |  |  |  |
| Tensile modulus, p.s.i | 114 | 90 | 97 | 74 | 104 | 120. |
| Elongation, percent | 240 | 180 | 200 | 200 | 220 | 200. |
| Initial color at 25° C | Cream | White | White | Off-white | Off-white | Off-white. |
| Color after 10 days at 121° C | Dark brown. | Black | Reddish tan. | ____do____ | Tan | Tan. |
| Volume resistivity, ohm-cm. at 25° C |  | $2 \times 10^{12}$ | $1 \times 10^{14}$ | $2 \times 10^{13}$ |  | $1 \times 10^{14}$. |
| Percent oil extraction, 15 hrs. at 85° C | 2 | Exudes on standing. | 2 | 3 | 2 | 2. |

Table I clearly shows the improvements in room temperature tensile and elongation, combined with more than a twofold increase in strength at 121° C., that are derived when the combination of our invention is used. Note, that if polyester, peroxide, and polyvinyl chloride are used in combination with a soluble stabilizer (slab 4), there is considerable improvement in room temperature properties including oil resistance but less improvement in high temperature strength.

It is also noted that the substitution of dicumyl peroxide (slab 7) for the tertiary-butyl peroxide leads to poor moldability (uneven ripples in the molded specimen) which is evidence of incipient crosslinking. The peroxide also leads to poorer heat stability.

The substitution of a dimethacrylate (slab 8) for the fumarate polyester of this invention leads to poor heat stability, poor compatibility, and poorer electrical properties.

It is further noted that the use of peroxide (slab 2) gives increased darkening in polyvinyl chloride on aging, whereas the peroxide plus polyester (slab 5) leads to an improvement over polyester plus polyvinyl chloride alone (slab 3).

Slabs 9 to 12, showing the use of various tertiary-butyl peroxides, are included for comparative purposes.

Finally, the electrical resistance of the polyester-polyvinyl chloride-peroxide combination (slab 5) is increased more than thirty-fold over the control samples 1, 2 and 3, to equal the value for rigid polyvinyl chloride, while the product remains flexible.

EXAMPLE III

|  | Grams | Moles |
| --- | --- | --- |
| Pelargonic acid | 1,882 | 11.9 |
| Maleic anhydride | 1,442 | 14.7 |
| Adipic acid | 701 | 4.8 |
| Diethylene glycol | 2,705 | 25.5 |
| p-Toluenesulfonic acid | 4.0 |  |
| Sodium tripolyphosphate | 6.7 |  |

The ingredients were polymerized by following the procedure of Example I, except that the total reaction period covered 7 hours instead of 5½ hours. Upon completion of the reaction, a total of 648 grams of distillate was collected as against a theoretical amount of 652 grams of water for complete reaction. The resulting polyester was an oily liquid of amber color having a theoretical molecular weight of 1020 and an average of 2.5 maleate groups per molecule.

EXAMPLE IIIa

This example shows the preparation of a monocarboxylic acid, which is a substituted amide also, and which is suitable as a polyester chain growth stopper when an excess of glycol is used to prepare the polyester. In addition, the amido group increases the polarity of the polyester and improves its compatiblity with polyvinyl chloride.

STEP 1

|  | Grams | Moles |
| --- | --- | --- |
| Di-n-butylamine | 3,382 | 26.18 |
| Adipic acid | 3,728 | 25.52 |
| p-Toluenesulfonic acid | 3.7 |  |
| Sodium tripolyphosphate | 7.1 |  |

The adipic acid, p-toluenesulfonic acid, and sodium tripolyphosphate were charged to a 3-necked flask after which the amine was added very slowly over a five-hour period during which time the temperature was increased to 210° C. The temperature was then maintained at 210° C. for 2 hours. The slow addition was for the purpose of minimizing the reaction of both carboxylic groups of the adipic acid with the amine. A nitrogen blanket was maintained throughout the reaction period. Upon completion of the reaction, 498 ml. of distillate were collected as against 471 ml. theoretical. The product was an amber-colored, low viscosity fluid, being essentially mono-(di-N-butyl) adipamide.

STEP 2

|  | Grams | Moles |
| --- | --- | --- |
| Mono-(di-N-butyl) adipamide of Step 1 | 2,624 | 10.2 |
| Adipic acid | 1,286 | 8.8 |
| Maleic anhydride | 755 | 7.7 |
| Diethylene glycol | 2,292 | 21.6 |
| p-Toluenesulfonic acid | 4.7 |  |
| Sodium tripolyphosphate | 4.3 |  |

The ingredients were polymerized according to the procedure of Example I. The theoretical amount of distillate was 639 ml. and 634 ml. were collected. The resulting polyester was a brownish fluid of medium viscosity having an average molecular weight of about 1200 and 2.5 maleate groups pere molecule.

EXAMPLE IV

The following components were compounded as 6 exemplary floor tile products. The components of each sample were mixed on a hot mill at 150° C. and then pressed into molds at 175° C. for 5 minutes at 30,000 p.s.i. The resulting slabs were ⅛ inch wide and measured 9″ x 9″.

| | Sample number (grams) | | | | | |
|---|---|---|---|---|---|---|
| | 1 | 2 | 3 | 4 | 5 | 6 |
| Opalon 630 | 200 | 200 | 200 | 200 | 200 | 200 |
| Phenylbutyl phthalate | 72 | 48 | 48 | 72 | 48 | 30 |
| Polyester of Example I | | | 24 | | 24 | |
| Polyester of Example III | | 24 | | | | |
| Polyester of Example IIIa | | | | | | 36 |
| 2,5-ditertiary-butyl peroxide-2,5-dimethyl hexane | | 1 | 1 | | 1 | 1 |
| Water ground calcium carbonate | 240 | 240 | 240 | | | 240 |
| Clay | 120 | 120 | 120 | | | 120 |
| Titanium dioxide | 10 | 10 | 10 | | | 10 |
| Barium-cadmium-zinc stabilizer | 8 | 8 | 8 | 4 | 4 | 8 |
| High melting point refined paraffin wax | 1 | 1 | 1 | 1 | 1 | 1 |
| Epoxidized soybean oil | 10 | 10 | 10 | 5 | 5 | 10 |

The properties of the molded products of Example IV are shown in Table II.

*Table II*

| | Sample number | | | | | |
|---|---|---|---|---|---|---|
| | 1 | 2 | 3 | 4 | 5 | 6 |
| Color | Light tan | White | White | Water-white | Water-white | Off-white. |
| Shore D hardness | 65 | 70 | 70 | 65 | 65 | 65. |
| Scratch width, inch | .028 | .015 | .008 | .008 | .008 | .015. |
| Abrasion loss, mg | 530 | 530 | 490 | | | 520. |
| Dimensional change, inch/foot: | | | | | | |
| 6 hours at 85° C | .05 | 0 | 0 | | | .02. |
| ½ hour at 120° C | .07 | 0 | 0 | .03 | 0 | |
| Effect of burning cigarette | Dark brown stain. | Light brown stain. | Tan stain | Blackened pit. | Very slight stain. | Light brown stain. |
| Red dye in kerosene (washed with soapy water afterward). | Red stain | Light red stain. | Very slight stain. | Red stain | do | Very slight stain. |

The data show the effect on properties important in floor tiles by including minor proportions of the grafting system. It is noted that every property has been improved significantly except abrasion resistance. The polyester of Example I appears to be superior to that of Examples III and IIIa.

EXAMPLE V

| | Grams | Moles |
|---|---|---|
| Pelargonic acid | 427 | 2.70 |
| Fumaric acid | 208 | 1.79 |
| Adipic acid | 386 | 2.64 |
| Diethylene glycol | 613 | 5.78 |
| p-Toluenesulfonic acid | 1.0 | |
| Sodium tripolyphosphate | 1.6 | |

The ingredients were reacted according to the procedure described in Example I. A total of 205 grams of distillate was collected as against a theoretical amount of 208 grams of water for complete reaction. The product was a low viscosity oil of amber color having a theoretical molecular weight of 1036 and an average of 1.25 fumarate groups per molecule.

EXAMPLE VI

| | Grams | Moles |
|---|---|---|
| Pelargonic acid | 411 | 2.6 |
| Fumaric acid | 377 | 3.25 |
| Adipic acid | 153 | 1.05 |
| Neopentyl glycol | 584 | 5.6 |
| p-Toluenesulfonic acid | .94 | |
| Sodium tripolyphosphate | 1.53 | |

The reaction was carried out according to the procedure described in Example I. 208 grams of distillate were collected out of a theoretical amount of 202 grams of water for complete reaction. The product was an oily colorless fluid having a theoretical molecular weight of 1015 and an average of 2.5 fumarate groups per molecule.

EXAMPLE VII

The following compounds were mixed as plastisols by simply stirring the ingredients together at room temperature in a vacuum for one-half hour.

| | Sample number (grams) | | | |
|---|---|---|---|---|
| | 1 | 2 | 3 | 4 |
| Polyester of Example III | | 20 | | |
| Polyester of Example V | | | 20 | |
| Polyester of Example VI | | | | 20 |
| Opalon 440 | 100 | 100 | 100 | 100 |
| Dioctyl phthalate | 40 | 40 | 40 | 40 |
| 2,5-ditertiary-butyl peroxide-2,5-dimethyl hexane | | .5 | .5 | .5 |
| Plastisol viscosity, cp. at 25° C.: | | | | |
| Fresh | 12,000 | 16,000 | 15,000 | 20,000 |
| After 3 weeks | 32,000 | 32,000 | 20,000 | 20,000 |

EFFECT OF HEATING PLASTISOLS FOR 5 MINUTES AT 180° C.

| | | | | |
|---|---|---|---|---|
| Color | (¹) | (²) | (³) | (⁴) |
| Adhesion to steel, lbs./inch | 0 | 1 | 1 | 8 |
| Shore A hardness | 80 | 82 | 82 | 82 |
| Tensile strength, p.s.i | 2,100 | 3,200 | 2,800 | 3,200 |
| Tear strength, lbs./inch width | 1,100 | 1,200 | 1,440 | |
| Heat distortion temperature (100% elongation/40 p.s.i. weight), ° C | 115 | 143 | | |

¹ Slightly amber.  ³ Slightly cloudy, slightly amber.
² Cloudy amber.  ⁴ Water-white.

The foregoing example shows that addition of the polyesters, despite their high viscosities, act to stabilize the viscosity of polyvinyl chloride plastisols plasticized with dioctyl phthalate so as to offset this disadvantage. It is noted that the polyesters increase tear strength which is a very important feature of vinyl chloride plastics. It is also noted that the polyester of Example VI is distinguished by the fact that it provides adhesion to metal while the others do not.

EXAMPLE VIIa

This example shows the use of an alcohol to terminate the growth of the polyester chain.

|  | Grams | Moles |
|---|---|---|
| Benzyl alcohol | 151 | 1.40 |
| Fumaric acid | 203 | 1.75 |
| Adipic acid | 701 | 4.80 |
| Neopentyl glycol | 610 | 5.85 |
| p-Toluenesulfonic acid | .9 |  |
| Sodium tripolyphosphate | 1.7 |  |

The components were reacted according to the description of Example I. A total of 260 ml. of distillate were collected compared to the theoretical amount of 236 ml. of water for complete reaction. The resulting polyester was a viscous, clear, water-white fluid having a theoretical molecular weight of 2040 and 2.5 fumarate groups per molecule.

EXAMPLE VIII

The following electrical insulation formulae were compounded on a hot mill at 150° C., cut into slabs, and molded into 50 mil slabs at 175° C. for 5 minutes at 30,000 p.s.i. pressure. Some of the milled sheets were cut into pieces and extruded at 150° C. and 177° C. into ⅛ inch rods.

|  | Sample number (grams) | | | | |
|---|---|---|---|---|---|
|  | 1 | 2 | 3 | 4 | 5 |
| Polyester of Example I |  | 45 |  | 45 |  |
| Polyester of Example III |  |  | 45 |  |  |
| Polyester of Example VIIa |  |  |  |  | 45 |
| Opalon 660 | 300 | 300 | 300 | 300 | 300 |
| Diisodecyl phthalate | 180 | 150 | 150 | 150 | 150 |
| Basic lead silicate sulfate | 18 | 18 | 18 | 18 | 18 |
| Stearic acid | .75 | .75 | .75 | .75 | .75 |
| Water ground calcium carbonate | 90 | 90 | 90 | 90 | 90 |
| 2,5-ditertiary-butyl peroxide-2,5-dimethyl hexane |  | 1.5 | 1.5 |  | 1.5 |
| Tertiary-butyl perbenzoate |  |  |  | 1.5 |  |

The properties of the four samples of Example VIII are shown in Table III.

Table III

|  | Sample number | | | | |
|---|---|---|---|---|---|
|  | 1 | 2 | 3 | 4 | 5 |
| Properties at 25° C.: |  |  |  |  |  |
|   Tensile strength, p.s.i. | 2,000 | 2,500 | 2,400 | 2,400 | 2,800 |
|   Elongation, percent | 250 | 360 | 300 | 360 | 330 |
|   Tensile modulus at 10% elongation, p.s.i. | 1,800 | 1,500 | 2,000 | 800 | 2,100 |
| Properties at 115° C.: |  |  |  |  |  |
|   Tensile strength, p.s.i. | 90 | 135 | 120 | 96 | 130 |
|   Elongation, percent | 200 | 290 | 250 | 210 | 250 |
|   Tensile modulus at 10% elongation, p.s.i. | 100 | 130 | 120 | 100 | 140 |
| Properties at 25° C. after 7 days treatment at 115° C.: |  |  |  |  |  |
|   Tensile strength, p.s.i. | 1,700 |  | 2,700 |  |  |
|   Elongation, percent | 100 |  | 280 |  |  |
|   Tensile modulus at 10% elongation, p.s.i. | 650 |  | 1,100 |  |  |
| Shore A hardness | 85 | 85 | 85 | 84 | 85 |
| Color: |  |  |  |  |  |
|   Initial at 25° C. | White | White | Cream | White | White |
|   After 7 days treatment at 115° C. | (1) | Tan | (2) | Tan | Cream |
| Volume resistivity, ohm-cm. at 25° C. | $6 \times 10^{12}$ | $2 \times 10^{14}$ | $2 \times 10^{13}$ | $1 \times 10^{14}$ | $1 \times 10^{14}$ |
| Oil extraction, percent | 5 | 2 | 2 | 2 |  |
| Clash-Berg temperature, °C. | −20 | −20 | −20 | −20 |  |
| Extrudability: |  |  |  |  |  |
|   At 150° C. | Good | Good |  |  |  |
|   At 175° C. | Poor | do |  |  |  |
| Water absorption, 5 days at 90° C., mg./sq. in. | 20 | 20 | 50 |  |  |

[1] Dark brown.     [2] Light tan.

The data in Table III show the increase in tensile and elongation properties both at room temperature and at 115° C., which conditions could be encountered in many electrical applications. Furthermore, the retention of physical properties after heat aging (sample 3 compared with sample 1) is of prime importance in this field. These improvements have been accomplished without sacrifice of low temperature properties as reflected by the Clash-Berg temperature where torsional stiffness reaches an arbitrary "stiff" value.

In addition, the data on sample 3 (Example VIII) show that when neopentyl glycol is replaced by diethylene glycol, the color is cream instead of white and the water absorption has increased more than twofold. The same holds true for propylene glycol. Neopentyl glycol appears to be specific for allowing pure white color in these systems and maintaining low water absorption.

EXAMPLE IX

This example shows the effect of grafting and its attendant advantages:

|  | Sample number (grams) | | |
|---|---|---|---|
|  | 1 | 2 | 3 |
| Dioctyl phthalate |  |  | 100 |
| Opalon 440 | 100 |  | 100 |
| Polyester of Example I | 100 | 100 |  |
| 2,5-ditertiary-butyl peroxide-2,5-dimethyl hexane | .3 | .3 | .3 |

The samples were drawn down to 50 mils on a Teflon sheet and reacted in an oven for 5 minutes at 180° C. The results were as follows:

|  | Sample number (grams) | | |
| --- | --- | --- | --- |
|  | 1 | 2 | 3 |
| Physical form | (1) | (2) | (3) |
| Percent soluble in cyclohexanone | 74 | 19 | 100 |
| Percent soluble in toluene | 25 | 19 | 50 |
| Percent polyvinyl chloride in insoluble portion in cyclohexanone | 60 | 0 | 0 |

1 Tough, flexible sheet.
2 Weak gel.
3 Tough, flexible sheet.

The above formulations were purposely designed to give an insoluble gel fraction so as to separate unreacted from reacted products. The results show that our polyesters, by themselves, will crosslink with peroxides, giving a low extraction in solvents. When polyvinyl chloride is added, the percent polyester insoluble in toluene (a non-solvent for polyvinyl chloride) increases from 19 to 50 (sample 1) but the percent soluble in cyclohexanone (a solvent for polyvinyl chloride) increases from 19 to 90. In other words, a large part of the polyester must be chemically attached to the polyvinyl chloride rather than polymerized with itself. The grafted polyester then takes on the solubility characteristics of the polyvinyl chloride, the rest being polymerized but not to the point of insolubility in toluene.

Another embodiment of this invention is shown in Example X.

EXAMPLE X

|  | Sample number (grams) | | |
| --- | --- | --- | --- |
|  | 1 | 2 | 3 |
| Diisodecyl phthalate | 40 |  |  |
| Polyester of Example V | 14 | 14 | 14 |
| Opalon 630 | 100 |  |  |
| Basic lead silicate sulfate | 6 |  | 6 |
| 2,5-ditertiary-butyl peroxide-2,5-dimethyl hexane | .2 | .2 | .2 |

Each of the samples of Example X were reacted for 20 minutes at 160° C. The results are shown in Table IV.

Table IV

|  | Sample number (grams) | | |
| --- | --- | --- | --- |
|  | 1 | 2 | 3 |
| Physical form of product | (1) | (2) | (2) |
| Percent soluble in cyclohexanone | 100 | 100 | 100 |
| Percent soluble in toluene | 25 | 100 | 100 |
| Percent of polyester insoluble in toluene | 100 | 0 | 0 |

1 Tough solid.
2 Liquid.

The table clearly shows that under identical conditions of catalyst and heat, at these ratios, substantially all of the polyester becomes insoluble in toluene (i.e., attached to polyvinyl chloride) in the presence of polyvinyl chloride, but remains unreacted when alone. Higher temperatures and increased peroxide content would produce a reaction of the polyester alone. In other words, the grafting reaction is independent of polyester homopolymerization.

EXAMPLE XI

The following experiments show the usefulness of the polyesters in rigid polyvinyl chloride formulations:

|  | Sample number (grams) | | | |
| --- | --- | --- | --- | --- |
|  | 1 | 2 | 3 | 4 |
| Opalon 630 | 50 | 50 |  |  |
| Vinylite VYNV-5 (97% vinyl chloride—3% vinyl acetate copolymer) |  |  | 50 | 50 |
| Basic lead silicate sulfate | 3 | 3 | 3 | 3 |
| 2,5-ditertiary-butyl peroxide-2,5-dimethyl hexane |  | .1 |  | .1 |
| Polyester of Example I |  | 10 |  | 10 |

The properties of each sample after thorough mixing at 160° C. are shown in Table V:

Table V

|  | Sample number | | | |
| --- | --- | --- | --- | --- |
|  | 1 | 2 | 3 | 4 |
| Initial plastograph reading | 2,000 | 1,500+ | 1,500 | 1,200 |
| Final plastograph reading | 2,000 | 2,500+ | 1,500 | 2,500+ |
| Shore D hardness | 82 | 82 | 82 | 82 |
| Tensile strength at 115° C., p.s.i | 360 | 350 |  |  |
| Tensile modulus at 115° C., p.s.i | 350 | 400 |  |  |
| Effect of heating for 10 days at 115° C | + | Tan | (1) | (2) |

1 Light brown.
2 Off-white.

The data show that the copolymer seems to be more effectively stabilized by the polyester than the homopolymer in these particular formulations.

EXAMPLE XII

This example shows the effect of inorganic additives on the graft reaction and properties of the polyvinyl chloride.

|  | Sample number (grams) | | |
| --- | --- | --- | --- |
|  | 1 | 2 | 3 |
| Polyester of Example I | 14 | 14 | 14 |
| Opalon 630 | 100 | 100 | 100 |
| Diisodecyl phthalate | 40 | 40 | 40 |
| Lead stearate (soluble) |  | 7 | 7 |
| Basic lead silicate sulfate (insoluble) | 7 |  | 0 |
| 2,5-ditertiary-butyl peroxide-2,5-dimethyl hexane | .23 | .23 |  |

The properties of each sample of Example XII after heating at 160° C. for 10 minutes are shown in Table VI:

Table VI

|  | Sample number | | |
| --- | --- | --- | --- |
|  | 1 | 2 | 3 |
| Plastograph reading, final | 1,600 | 1,100 | 1,000 |
| Shore D hardness | 46 | 42 | 39 |
| Tensile strength at 25° C., p.s.i | 3,200 | 3,200 | 2,800 |
| Tensile strength at 115° C., p.s.i | 130 | 70 | 70 |
| Specific viscosity of polyvinyl chloride [1] | .55 | .40 | .38 |
| Percent of polyester not grafted [2] | 0 | 35 | 100 |

1 Specific viscosity = $\frac{\text{Viscosity of solution}}{\text{Viscosity of solvent}} - 1$ for .4% solution in cyclohexanone.
2 Graft polymer was separated by fractionation of cyclohexanone solution by addition of ethanol, and successive fractions analyzed for polyvinyl chloride/polyester ratio.

The table shows that the product is a soluble graft polymer which, in the case of sample 1, contains all of the polyester chemically bound to the polyvinyl chloride. If, however, no basic lead silicate sulfate is used (or another specific insoluble but readily dispersible additive), only 65 percent of the polyester is grafted. This improves the room temperature properties but not the properties at 115° C. It is assumed that the increase in specific viscosity is due to the added molecular weight of the grafted chain plus the possibility of two growing graft chains combining to double the molecular weight of the polyvinyl chloride.

The ratios of unsaturated polyester, peroxide, and vinyl chloride-containing polymer in the composition may be varied depending upon the type of processing and the end use to which the compositions will be put. In general, the polyester may constitute between about 3 percent and 100 percent based on the weight of the vinyl polymer; and the peroxide content may be between .02 and 1 percent based on the weight of the vinyl polymer. These compositions may be further modified by the inclusion of additives, such as fillers, stabilizers, coloring agents and plasticizers for vinyl chloride polymers, such as dioctyl phthalate, phenylbutyl phthalate, dibutyl phthalate, dicarpyl phthalate, diisodecyl phthalate, dioctyl azelate, dioctyl adipate, etc.

Grafting of the polyester and vinyl chloride polymer may be carried out in the presence of the peroxide at temperatures ranging between about 100° C. and 200° C. for 30 minutes to 2 minutes.

We claim:

1. An unsaturated polyester consisting of the condensation product of (a) a saturated aliphatic glycol containing 2 to 6 carbon atoms, (b) a dicarboxylic acid selected from the group consisting of saturated aliphatic dicarboxylic acids containing 4 to 10 carbon atoms, phthalic acid, and phthalic anhydride, (c) a compound for terminating the growth of the polyester chain selected from the group consisting of monocarboxylic acids and monohydroxy alcohols, (d) a butene dioic compound selected from the group consisting of maleic acid, fumaric acid, maleic anhydride, and mixtures thereof, said reactants (a), (b), (c) and (d) being present in such proportions as to produce a polyester which is substantially completely devoid of terminal carboxyl and hydroxyl groups, said polyester having an average molecular weight of between about 300 and 4000 and containing between about 1 and 2.5 butene dioate groups per molecule.

2. A polyester according to claim 1 wherein an excess of glycol is used and a monocarboxylic acid is added in amount sufficient to react with the excess amount of glycol to terminate the growth of the polyester chain.

3. A polyester according to claim 2 wherein the glycol is neopentyl glycol and the monocarboxylic acid is pelargonic acid.

4. A polyester according to claim 1 wherein an excess of dicarboxylic acid is used and a monohydroxy alcohol is added in amount sufficient to react with the excess acid to terminate the growth of the polyester chain.

5. A polyester according to claim 4 wherein the dicarboxylic acid is adipic acid and the monohydroxy alcohol is benzyl alcohol.

6. A polyester consisting of the condensation product of adipic acid, fumaric acid, an excess amount of neopentyl glycol, and pelargonic acid in amount sufficient to react with the excess glycol, the resulting polyester being substantially completely devoid of terminal carboxyl and hydroxyl groups and having an average molecular weight between about 1015 and 2040 and containing between about 1 and 2.5 fumarate groups per molecule.

7. A polyester consisting of the condensation product of adipic acid, maleic anhydride, an excess amount of diethylene glycol, and pelargonic acid in amount sufficient to react with the excess glycol, the resulting polyester being substantially completely devoid of terminal carboxyl and hydroxyl groups and having an average molecular weight of 1020 and containing about 2.5 maleate groups per molecule.

8. A polyester consisting of the condensation product of adipic acid, an excess amount of diethylene glycol, fumaric acid, and pelargonic acid in amount sufficient to react with the excess glycol, the resulting polyester being substantially completely devoid of terminal carboxyl and hydroxyl groups and having an average molecular weight of 1035 and containing about 1.25 fumarate groups per molecule.

9. An unsaturated polyester which is substantially completely devoid of terminal carboxyl and hydroxyl groups consisting of the condensation product of 6.35 moles of neopentyl glycol, 3.9 moles of adipic acid, 1.4 moles of pelargonic acid and 1.75 moles of fumaric acid, said polyester having an average molecular weight of about 2040 and containing about 2.5 fumarate groups per molecule.

10. An unsaturated polyester which is substantially completely devoid of terminal carboxyl and hydroxyl groups consisting of the condensation product of 5.6 moles of neopentyl glycol, 1.05 moles of adipic acid, 2.6 moles of pelargonic acid, and 3.25 moles of fumaric acid, said polyester having an average molecular weight of about 1015 and containing about 2.5 fumarate groups per molecule.

11. An unsaturated polyester which is substantially completely devoid of terminal carboxyl and hydroxyl groups consisting of the condensation product of 25.5 moles of diethylene glycol, 4.8 moles of adipic acid, 11.9 moles of pelargonic acid, and 14.1 moles of maleic anhydride, said polyester having an average molecular weight of about 1020 and containing about 2.5 maleate groups per molecule.

12. An unsaturated polyester which is substantially completely devoid of terminal carboxyl and hydroxyl groups consisting of the condensation product of 5.78 moles of diethylene glycol, 2.64 moles of adipic acid, 2.7 moles of pelargonic acid, and 1.79 moles of fumaric acid, said polyester having an average molecular weight of about 1035 and containing about 1.25 fumarate groups per molecule.

13. An unsaturated polyester which is substantially completely devoid of terminal carboxyl and hydroxyl groups consisting of the condensation product of 1.4 moles of benzyl alcohol, 1.75 moles of fumaric acid, 4.8 moles of adipic acid, and 5.85 moles of neopentyl glycol, said polyester having an average molecular weight of about 2040 and containing about 2.5 fumarate groups per molecule.

14. A composition comprising a vinyl polymer selected from the group consisting of polyvinyl chloride and vinyl chloride copolymerized with another polymerizable monomer, 3 percent to 100 percent of the polyester of claim 1 based on the weight of the vinyl polymer, and .02 percent to 1 percent of a tertiary-butyl peroxide based on the weight of the vinyl polymer.

15. A composition comprising a vinyl polymer selected from the group consisting of polyvinyl chloride and vinyl chloride copolymerized with another polymerizable monomer, 3 percent to 100 percent of the polyester of claim 1 based on the weight of the vinyl polymer, and .02 percent to 1 percent based on the weight of the vinyl polymer of a peroxide selected from the group consisting of ditertiary-butyl peroxide, tertiary-butyl perbenzoate, ditertiary-butyl diperphthalate, 2,5-ditertiary-butyl peroxide-2,5-dimethyl hexane, and 2,5-ditertiary-butyl peroxide-2,5-dimethyl hexyne.

16. A composition according to claim 15 wherein the vinyl polymer is polyvinyl chloride.

17. A composition according to claim 15 wherein the vinyl polymer is a copolymer consisting of 85 percent to 97 percent vinyl chloride and 15 percent to 3 percent vinyl acetate.

18. A composition according to claim 15 which is modified by the addition of a finely divided insoluble but dispersible material selected from the group consisting of basic lead salts, titanium dioxide, carbon black, calcium silicate and asbestos, said material being present in amounts ranging between about 1 to 50 percent based on the weight of the total composition.

19. A composition comprising polyvinyl chloride, 10 percent to 50 percent of the polyester of claim 9, and .02 percent to 1 percent of a peroxide selected from the group consisting of ditertiary-butyl peroxide, tertiary-butyl perbenzoate, ditertiary-butyl, diperphthalate, 2,5-ditertiary-butyl peroxide-2,5-dimethyl hexane, 2,5-di-tertiary-butyl peroxide-2,5-dimethyl hexyne, the amounts of said polyester and peroxide being based on the weight of the polyvinyl chloride.

20. A composition comprising polyvinyl chloride, 14 percent of the polyester of claim 9, .2 percent of 2,5-di-tertiary-butyl peroxide-2,5-dimethyl hexane, 6 percent of basic lead silicate sulfate, 38 percent of a plasticizer, the amounts of said polyester, peroxide, lead compound and plasticizer being based on the weight of the polyvinyl chloride.

21. A shaped article derived by heating the composition of claim 15 at temperatures ranging between about 100° C. and 200° C. for about 30 minutes to 2 minutes.

References Cited by the Examiner
UNITED STATES PATENTS

| | | | |
|---|---|---|---|
| 2,036,009 | 3/1936 | Wright | 260—873 |
| 2,385,256 | 9/1945 | Britton et al. | 260—873 |
| 2,647,098 | 7/1953 | Smith et al. | 260—77 |
| 2,851,379 | 9/1958 | Staudinger et al. | 260—873 |
| 2,877,203 | 3/1959 | Forsythe et al. | 260—873 |
| 3,039,979 | 6/1962 | Carlick et al. | 260—76 |
| 3,040,000 | 6/1962 | Stephens et al. | 260—77 |
| 3,055,869 | 9/1962 | Wilson et al. | 260—76 |
| 3,153,005 | 10/1964 | Minter | 260—873 |
| 3,157,713 | 11/1964 | Leese | 260—884 |

MURRAY TILLMAN, *Primary Examiner.*

L. J. BERCOVITZ, *Examiner.*

J. A. KOLASCH, J. T. GOOLKASIAN,
*Assistant Examiners.*